(12) United States Patent  
Cuddihy et al.

(10) Patent No.: US 9,272,708 B2
(45) Date of Patent: Mar. 1, 2016

(54) AUTONOMOUS VEHICLE ENTERTAINMENT SYSTEM

(71) Applicant: Ford Global Technologies, LLC, Dearborn, MI (US)

(72) Inventors: Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 14/041,364

(22) Filed: Sep. 30, 2013

(65) Prior Publication Data

US 2015/0094896 A1 Apr. 2, 2015

(51) Int. Cl.
*B60W 30/00* (2006.01)
*H04N 21/414* (2011.01)

(52) U.S. Cl.
CPC ......... *B60W 30/00* (2013.01); *H04N 21/41422* (2013.01)

(58) Field of Classification Search
CPC .................. B60W 30/00; H04N 21/41422
See application file for complete search history.

(56) References Cited

U.S. PATENT DOCUMENTS

| 6,733,133 | B2 | 5/2004 | Egle et al. |
| 7,036,936 | B2 | 5/2006 | Hattori |
| 7,126,583 | B1 | 10/2006 | Breed |
| 7,413,233 | B1 | 8/2008 | Jung |
| 7,424,414 | B2 | 9/2008 | Craft |
| 8,243,214 | B2 | 8/2012 | Park et al. |
| 8,352,112 | B2 | 1/2013 | Mudalige |
| 8,359,149 | B2 | 1/2013 | Shin |
| 8,768,539 | B1 | 7/2014 | Clement et al. |
| 8,880,270 | B1 * | 11/2014 | Ferguson et al. ............ 701/23 |
| 2005/0200696 | A1 | 9/2005 | Schedivy |

(Continued)

FOREIGN PATENT DOCUMENTS

| EP | 2616870 | 3/2012 |
| JP | H07154724 A | 6/1995 |

(Continued)

OTHER PUBLICATIONS

Kuchinskas, "Crash Course: Training the Brain of a Driverless Car", Apr. 11, 2013, http://www.scientificamerican.com/article.cfm?id=autonomous-driverless-car-brain.

(Continued)

*Primary Examiner* — John Q Nguyen
*Assistant Examiner* — Jordan S Fei
(74) *Attorney, Agent, or Firm* — Frank MacKenzie; Bejin Bieneman PLC (57) ABSTRACT

A vehicle system includes an autonomous mode controller and an entertainment system controller. The autonomous mode controller controls a vehicle in an autonomous mode. The entertainment system controller presents media content on a first display while the vehicle is operating in the autonomous mode and on a second display when the vehicle is operating in a non-autonomous mode. A method includes determining whether a vehicle is operating in an autonomous mode, presenting media content on a first display while the vehicle is operating in the autonomous mode, and transferring presentation of the media content to a second display when the vehicle is operating in a non-autonomous mode.

18 Claims, 6 Drawing Sheets

(56) References Cited

U.S. PATENT DOCUMENTS

| | | | |
|---|---|---|---|
| 2005/0249357 A1* | 11/2005 | Schedivy | ........................ 381/86 |
| 2008/0144944 A1 | 6/2008 | Breed | |
| 2009/0122139 A1 | 5/2009 | Grimmel et al. | |
| 2010/0253918 A1* | 10/2010 | Seder | .................... G01S 13/723 |
| | | | 353/13 |
| 2010/0316255 A1 | 12/2010 | Mathony et al. | |
| 2011/0128453 A1 | 6/2011 | Cho | |
| 2012/0083960 A1 | 4/2012 | Zhu et al. | |
| 2012/0883960 | 4/2012 | Zhu et al. | |
| 2012/0173069 A1 | 7/2012 | Tsimhoni et al. | |
| 2013/0111793 A1 | 5/2013 | Shape et al. | |
| 2014/0303827 A1* | 10/2014 | Dolgov et al. | .................. 701/23 |

FOREIGN PATENT DOCUMENTS

| | | |
|---|---|---|
| WO | 9830018 | 7/1998 |
| WO | 2012035128 | 3/2012 |

OTHER PUBLICATIONS

Szondy, "University of Oxford Develops Low-Cost Self-Driving Car System", Feb. 18, 2013, http://www.gizmag.com/oxford-robot-car/26282/.

Berardini, "Suzuki SXBox 360 Concept Car Pictures", http://news.teamxbox.com/xbox/12494/Suzuki-SXBox-Xbox-360-Concept-Car-Pictures/ Dec. 28, 2006.

Peter Murray, entitled "Volkwagen's New 'Temporary Autopilot' is Cruise Control on Steroids," dated Jul. 11, 2011.

Joseph Rose, entitled "The driverless car's time has come in Oregon," dated Apr. 12, 2013.

Alan Bellows, entitled "The Many Benefits of the Self-Driving Cars of Tomorrow," dated Sep. 11, 2005.

\* cited by examiner

AUTONOMOUS VEHICLE ENTERTAINMENT SYSTEM

CROSS-REFERENCE TO RELATED APPLICATION

This application is related to U.S. Ser. No. 14/042,670 filed on Sep. 30, 2013 entitled "AUTONOMOUS VEHICLE ENTERTAINMENT SYSTEM", the contents of which are hereby incorporated by reference in their entirety.

BACKGROUND

Vehicles operating in an autonomous (e.g., driverless) mode can relieve occupants, especially the driver, from some driving-related responsibilities. When operating in an autonomous mode, the vehicle can navigate to various locations using on-board sensors, allowing the vehicle to travel with minimal human interaction or in some cases without any passengers. Therefore, autonomous vehicles give passengers, especially the person who would otherwise be driving the vehicle, the opportunity to do other things while travelling. Instead of concentrating on numerous driving-related responsibilities, the driver may be free to watch movies or other media content, converse with other passengers, read, etc., while riding in an autonomous vehicle.

DETAILED DESCRIPTION

An exemplary vehicle system includes an autonomous mode controller and an entertainment system controller. The autonomous mode controller controls a vehicle in an autonomous mode. The entertainment system controller presents media content on a first display while the vehicle is operating in the autonomous mode and on a second display when the vehicle is operating in a non-autonomous mode. A method includes determining whether a vehicle is operating in an autonomous mode, presenting media content on a first display while the vehicle is operating in the autonomous mode, and transferring presentation of the media content to a second display when the vehicle is operating in a non-autonomous mode.

The FIGS. illustrate an exemplary vehicle entertainment system for an autonomous vehicle. The system may take many different forms and include multiple and/or alternate components and facilities. While an exemplary system is shown, the exemplary components illustrated are not intended to be limiting. Indeed, additional or alternative components and/or implementations may be used.

Figure 1:
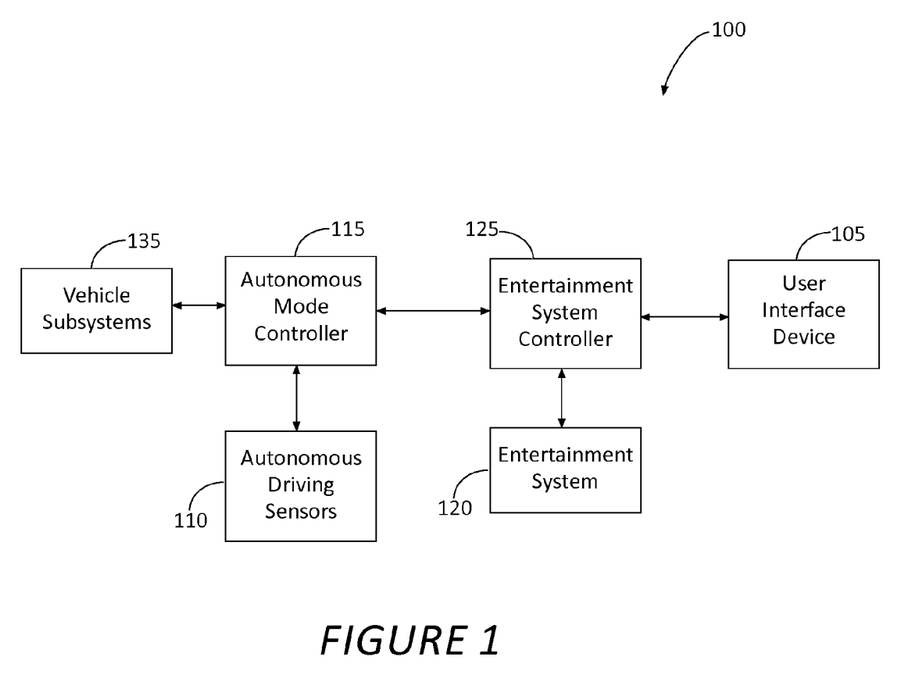
FIG. 1 is a block diagram of components of an exemplary autonomous vehicle.

As illustrated in FIG. 1, a vehicle 100 includes a user interface device 105, autonomous driving sensors 110, an autonomous mode controller 115, an entertainment system 120, and an entertainment system controller 125. The vehicle 100 may include any passenger or commercial vehicle such as a car, a truck, a sport utility vehicle, a taxi, a bus, a train, an airplane, etc.

The user interface device 105 may be configured to present information to a user, such as a driver, during operation of the vehicle 100. Moreover, the user interface device 105 may be configured to receive user inputs. Thus, the user interface device 105 may be located in a passenger compartment 130 (see FIGS. 2A-2B) of the vehicle 100. In some possible approaches, the user interface device 105 may include a touch-sensitive display screen. The user interface device 105 may further be configured to generate an audible alarm, a visual alarm, or both.

The autonomous driving sensors 110 may include any number of devices configured to generate signals that help navigate the vehicle 100 while the vehicle 100 is operating in an autonomous (e.g., driverless) mode. Examples of autonomous driving sensors 110 may include a radar sensor, a lidar sensor, a camera, or the like. The autonomous driving sensors 110 help the vehicle 100 "see" the roadway and/or negotiate various obstacles while the vehicle 100 is operating in the autonomous mode.

The autonomous mode controller 115 may be configured to control one or more subsystems 135 while the vehicle 100 is operating in the autonomous mode. Examples of subsystems 135 that may be controlled by the autonomous mode controller 115 may include a brake subsystem, a suspension subsystem, a steering subsystem, and a powertrain subsystem. The autonomous mode controller 115 may control any one or more of these subsystems 135 by outputting signals to control units associated with these subsystems 135. The autonomous mode controller 115 may control the subsystems 135 based, at least in part, on signals generated by the autonomous driving sensors 110.

Figure 2A:
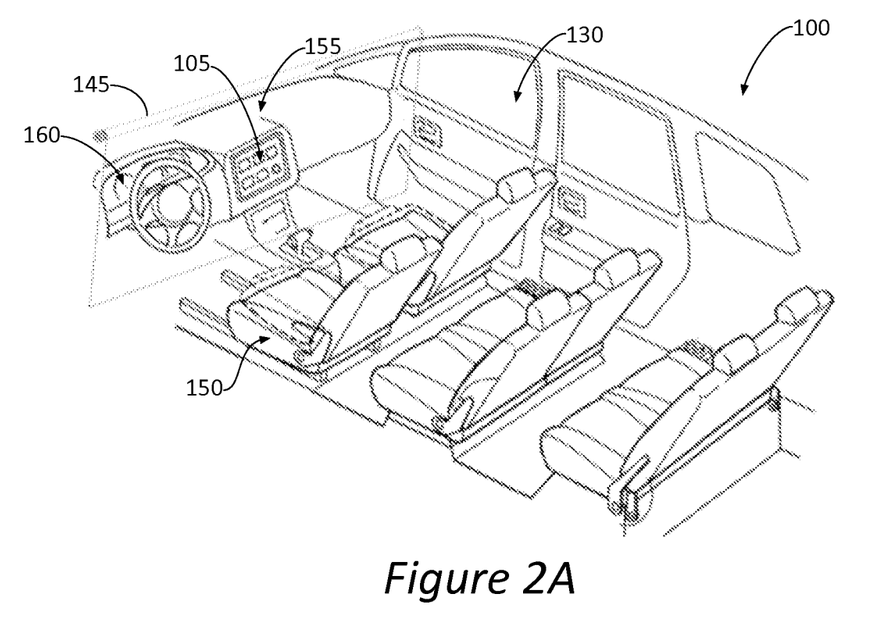
FIGS. 2A-2B are views of an exemplary entertainment system of the vehicle of FIG. 1 while operating in an autonomous mode.
Figure 2B:
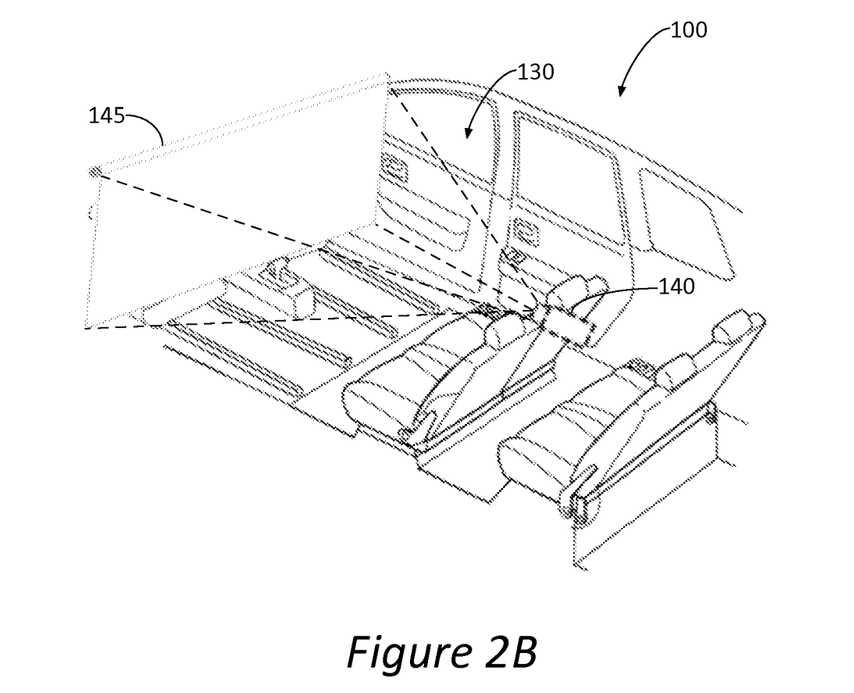

The entertainment system 120 may be configured to present media content or other types of content to one or more passengers. Examples of media content may include movies, television shows, games, music, videos, or the like. The entertainment system 120 may include a projector 140 and a projection screen 145 (see FIGS. 2A and 2B), both of which may be located within the passenger compartment 130 of the vehicle 100. The projector 140 may be mounted to a ceiling of the vehicle 100 and generally aimed toward the projection screen 145 to project media content onto the projection screen 145 for viewing by one or more passengers of the vehicle 100. The projection screen 145 may be located near the front of the vehicle 100, such as near the windshield. In some possible implementations, the projector 140, the projection screen 145, or both, may be configured to retract into the ceiling when the vehicle 100 is operating in a manual (e.g., a non-autonomous) mode. The projector 140, the projection screen 145, or both may be actuated (e.g., lowered from the ceiling) when the vehicle 100 is operating in the autonomous mode. FIG. 2A shows the projection screen 145 retracted (with the outline of the projection screen 145 when lowered shown for illustrative purposes only) and FIG. 2B shows the projector 140 and projection screen 145 lowered from the ceiling. FIG. 2B also illustrates that some of the seats 150 in the passenger compartment 130 may be stowed during presentation of the media content.

Figure 3:
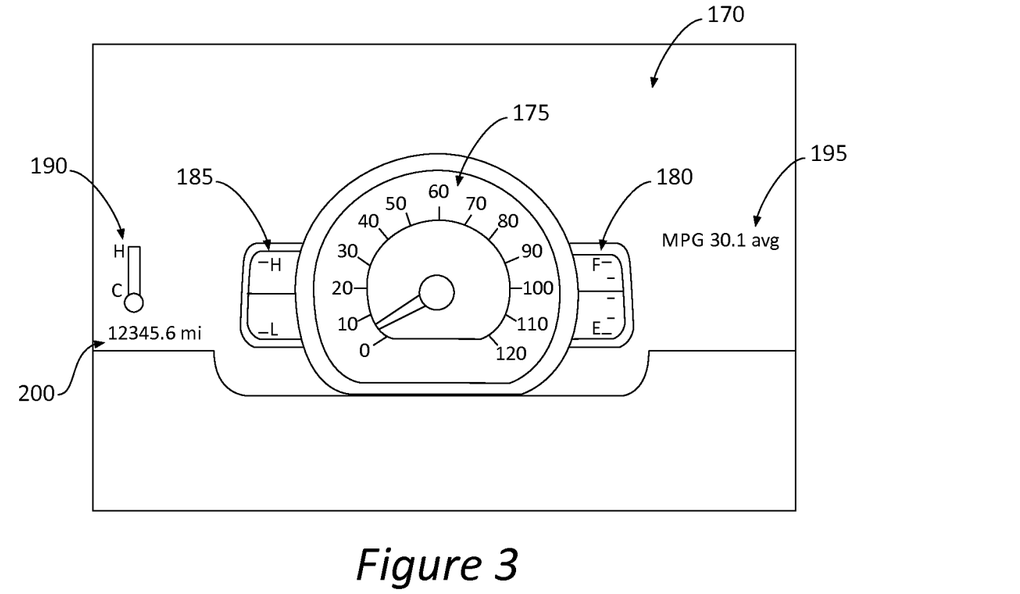
FIG. 3 illustrates an exemplary graphical user interface in the vehicle.
Figure 4:
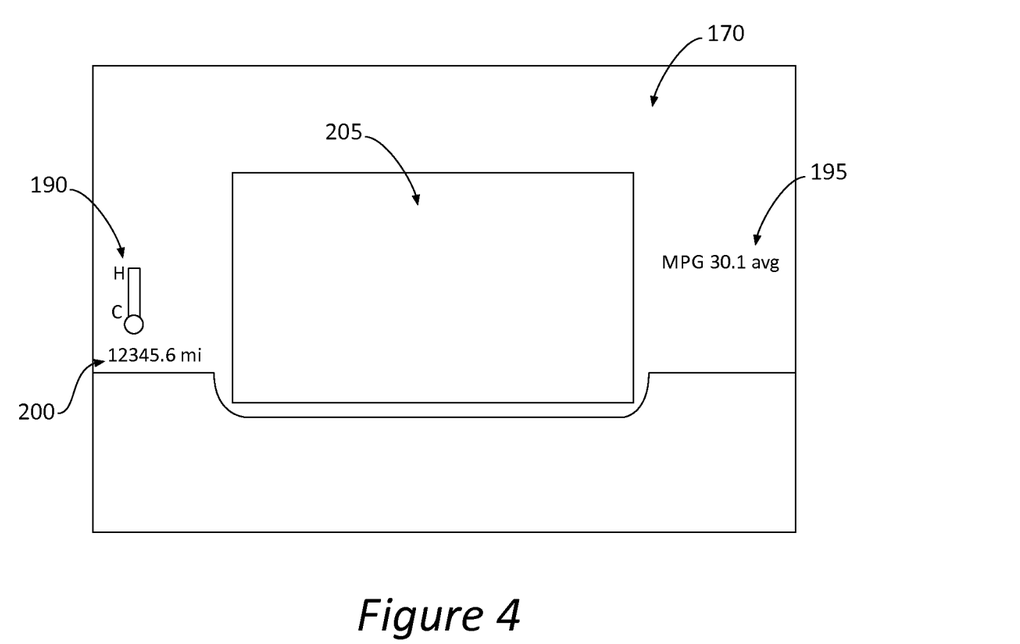
FIG. 4 illustrates the graphical user interface when the entertainment system is in use.
Figure 5:
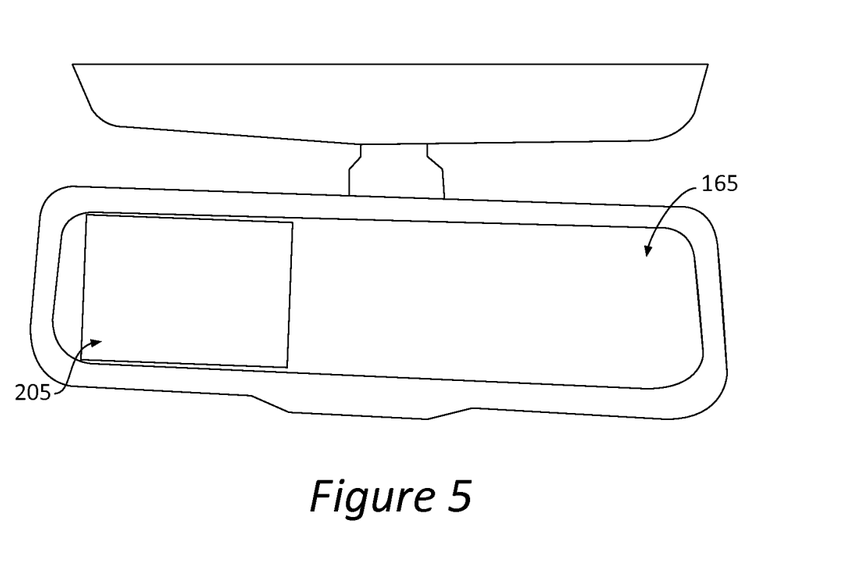
FIG. 5 illustrates an alternate location of the exemplary graphical user interface for when the entertainment system is in use.

As shown in FIGS. 3-5, the entertainment system 120 may include other display devices 205 located in the passenger compartment 130 of the vehicle 100 for presenting media content when the vehicle 100 is operating in the autonomous or non-autonomous modes. For example, the entertainment system 120 may be configured to present media content via a dashboard 155, an instrument cluster 160 (See FIGS. 3-4), or a rearview mirror 165 (See FIG. 5).

The entertainment system 120 may be configured to receive media content from any number of sources. In some possible implementations, the entertainment system 120 may be configured to access media content locally from a memory device (not shown) incorporated into the vehicle 100 or remotely via a network. The entertainment system 120 may be further configured to receive media content from, e.g., a mobile device brought into the vehicle 100 by one of the passengers. The entertainment system 120 may communicate with the mobile device via a wired (e.g., USB) or wireless (e.g., Bluetooth®) communication protocol.

The entertainment system controller 125 may be configured to control the operation of the entertainment system 120. The entertainment system controller 125 may present media content in the passenger compartment 130 while the vehicle 100 is operating in the autonomous mode. Prior to presenting media content, the entertainment system controller 125 may determine whether the vehicle 100 is operating in the autonomous mode based on, e.g., signals received from the autonomous mode controller 115, signals received from the autonomous driving sensors 110, and/or a user input provide via the user interface device 105. After determining that the vehicle 100 is operating in the autonomous mode, the entertainment system controller 125 may actuate (e.g., lower) the projection screen 145 and/or the projector 140 from the ceiling. The entertainment system controller 125 may further turn on the projector 140, cause the entertainment system 120 to access the media content (either locally or remotely), and cause the entertainment system 120 to present the media content to the passengers of the vehicle 100.

Before the vehicle 100 begins to operate in a non-autonomous mode, or if the passengers no longer wish to consume media content via the entertainment system 120, the entertainment system controller 125 may turn off the projector 140 and retract the projection screen 145 and/or the projector 140 into the ceiling. The entertainment system controller 125 may do so in response to a user input or a signal received from, e.g., the autonomous mode controller 115.

Some interaction from one of the passengers (e.g., the driver) may be required while other passengers wish to continue to consume media content. In such instances, the entertainment system controller 125 may transfer the presentation of the media content to a different display device 205. That is, the entertainment system controller 125 may retract the projection screen 145 and projector 140 when the driver assumes control of the vehicle 100 (i.e., the vehicle 100 is no longer operating in the non-autonomous mode) and transfer the presentation of the media content to another display device 205 such as a display in the dashboard 155, the instrument cluster 160, or the rearview mirror 165. Alternatively, the entertainment system controller 125 may transfer the presentation of the media content from, e.g., a display device 205 in the instrument cluster 160 to, e.g., a display device 205 in the rearview mirror 165. In other possible approaches, or in response to a user input, the entertainment system controller 125 may stop or pause the presentation of the media content when the vehicle 100 switches from operating in the autonomous mode to the non-autonomous mode.

In general, computing systems and/or devices, such as the user interface device 105, the autonomous mode controller 115, and the entertainment system controller 125, may employ any of a number of computer operating systems, including, but by no means limited to, versions and/or varieties of the SYNC® operating system by Ford Motor Company, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIGS. 3-5 illustrate an exemplary graphical user interface 170 presented on different display devices 205 in the vehicle 100. FIG. 3 illustrates an example of a graphical user interface 170 that may be presented in the passenger compartment 130 of the vehicle 100. As shown, the graphical user interface 170 includes a speedometer 175, a fuel gauge 180, a battery charge indicator 185 (for, e.g., electric or hybrid vehicles), an engine temperature indicator 190, a fuel economy indicator 195, and an odometer 200. This graphical user interface 170 may be part of the instrument cluster 160. The graphical user interface 170 shown in FIG. 3 may be presented while the vehicle 100 is operating in the non-autonomous mode. With reference now to FIG. 4, when the vehicle 100 is operating in the autonomous mode, and in response to user input, the graphical user interface 170 may be updated to present media content. For example, as shown in FIG. 4, the speedometer 175, the fuel gauge 180, and the battery charge indicator 185 may be replaced with a display device 205 for viewing media content. The display device 205 may be part of the entertainment system 120, and the display of the media content may be controlled by the entertainment system controller 125. Display devices 205 may be incorporated into other components in the passenger compartment 130 of the vehicle 100. As shown in FIG. 5, a display device 205 may be incorporated into the rearview mirror 165. Thus, passengers other than the driver can continue to view media content even after the driver has assumed control of the vehicle 100 (i.e., the vehicle 100 is no longer operating in the autonomous mode).

Figure 6:
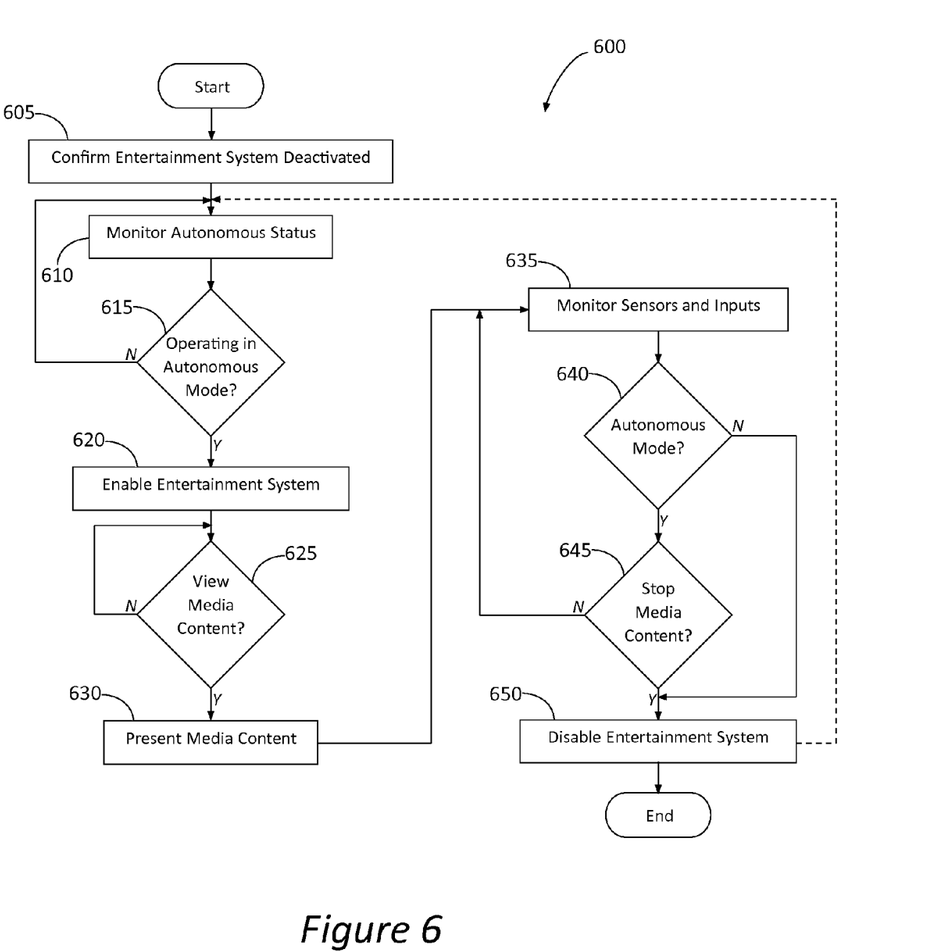
FIG. 6 is a flowchart of an exemplary process that may be implemented by the entertainment system.

FIG. 6 is a flowchart of a process 600 that may be implemented in the entertainment system controller 125 to control the operation of the entertainment system 120 during use of the vehicle 100.

At block 605, the entertainment system controller 125 may confirm that one or more components of the entertainment system 120 are deactivated. For instance, the entertainment system controller 125 may confirm that the projector 140, the projection screen 145, or both are deactivated. If one or more of the components are currently active, the entertainment system controller 125 may deactivate any active components.

At block 610, the entertainment system controller 125 may monitor a status of one or more of the autonomous driving sensors 110. The status of the autonomous driving sensors 110 may be determined from one or more signals output by the autonomous mode controller 115. The status may indicate whether the vehicle 100 is operating in the autonomous mode or needs to switch from the autonomous mode to a non-autonomous mode.

At decision block 615, the entertainment system controller 125 may determine whether the vehicle 100 is operating in the autonomous mode. As discussed above, the entertainment system controller 125 may determine whether the vehicle 100 is operating in the autonomous mode by monitoring the status of the autonomous driving sensors 110. The process 600 may only continue if the vehicle 100 is operating in the autonomous mode. Therefore, the process 600 may return to block 610 if the vehicle 100 is not operating in the autonomous mode. If the vehicle 100 is operating in the autonomous mode, the process 600 may continue at block 620.

At block 620, the entertainment system controller 125 may enable the entertainment system 120. Enabling the entertainment system 120 may include lowering the projection screen 145 and/or the projector 140 from the ceiling and turning on the projector 140.

At decision block 625, the entertainment system controller 125 may determine whether a user input has been received via, e.g., the user interface device 105 that indicates the user's desire to view media content via the entertainment system 120. If the user input has been received, the process 600 may continue at block 630. If the user input has not been received, the process 600 may repeat block 625 until the user input is received.

At block 630, the entertainment system controller 125 may cause the entertainment system 120 to present the media content in the passenger compartment 130 of the vehicle 100. The entertainment system 120 may continue to present media content until either a user input is received indicating a user's desire for the entertainment system 120 to stop presenting the media content or before the vehicle 100 switches from the autonomous mode to a non-autonomous mode of operation.

At block 635, the entertainment system controller 125 may continue to monitor the autonomous driving sensors 110 and also for any user inputs indicating the user's desire to no longer view media content through the entertainment system 120. For example, the entertainment system controller 125 may monitor the autonomous driving sensors 110 for signals indicating that user intervention is necessary or that the vehicle 100 is going to stop operating in the autonomous mode.

At decision block 640, the entertainment system controller 125 may determine whether the vehicle 100 is still operating in the autonomous mode. If so, the process 600 may continue at decision block 645. If the vehicle 100 is operating in a non-autonomous mode, the process 600 may continue at block 650.

At decision block 645, the entertainment system controller 125 may determine whether a user input indicating the user's desire to stop presenting media content through the entertainment system 120 has been received. If such a user input has been received, the process 600 may continue at block 650. If no user input indicating that the user desires for the entertainment system 120 to stop providing media content in the passenger compartment 130, the process 600 may return to block 635.

At block 650, the entertainment system controller 125 may disable one or more components of the entertainment system 120. Disabling one or more components of the entertainment system 120 may include retracting the projection screen 145, disabling the projector 140, or both. Moreover, disabling one or more components of the entertainment system 120 may include causing any displays in the passenger compartment 130 to return to a normal operating mode. After block 650, the process 600 may end or return to block 610.

Figure 7:
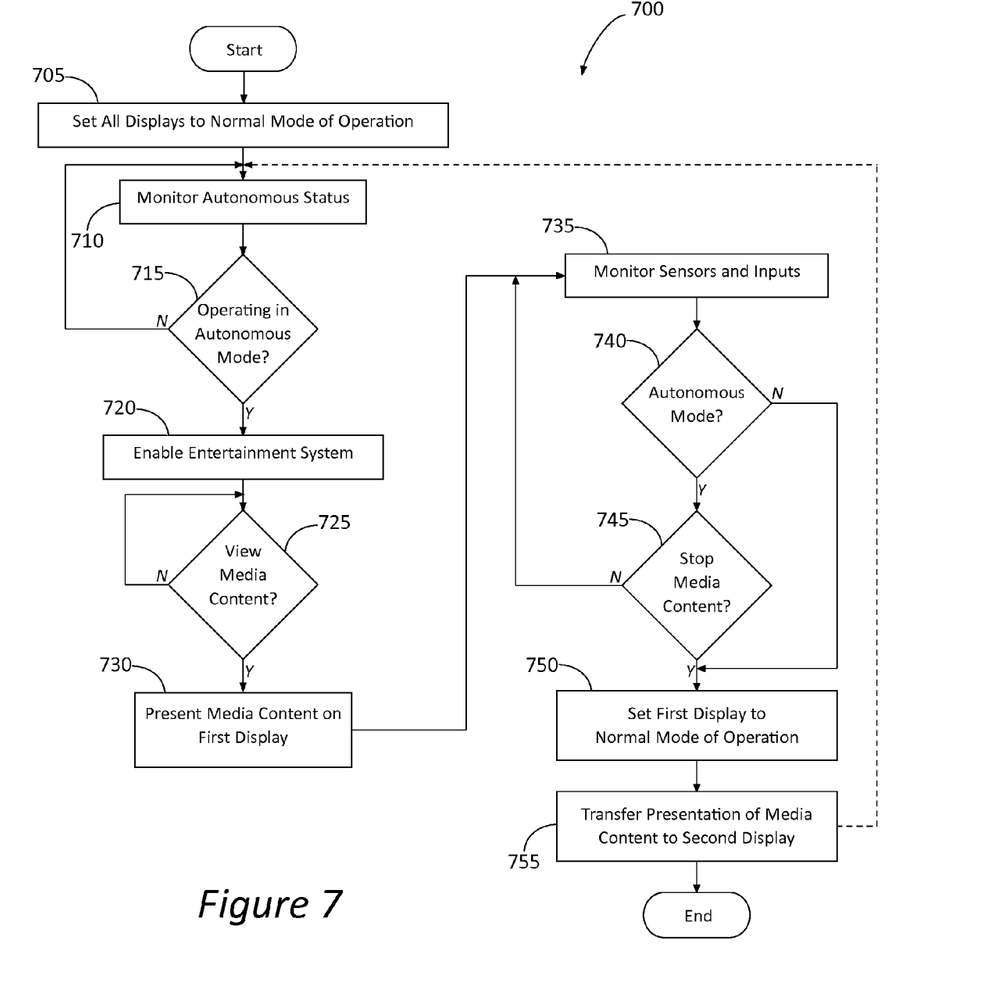
FIG. 7 is a flowchart of another exemplary process that may be implemented by the entertainment system.

FIG. 7 is a flowchart of an example process 700 that may be implemented by the entertainment system controller 125 during, e.g., a transition from the vehicle 100 operating in the autonomous mode to the non-autonomous mode.

At block 705, the entertainment system controller 125 may cause the displays of the entertainment system 120 to operate in a normal mode of operation. This may include disabling one or more components of the entertainment system 120 such as retracting the projection screen 145, disabling the projector 140, or both.

At block 710, the entertainment system controller 125 may monitor a status of one or more of the autonomous driving sensors 110. The status of the autonomous driving sensors 110 may be determined from one or more signals output by the autonomous mode controller 115. The status may indicate whether the vehicle 100 is operating in the autonomous mode or needs to switch from the autonomous mode to a non-autonomous mode.

At decision block 715, the entertainment system controller 125 may determine whether the vehicle 100 is operating in the autonomous mode. As discussed above, the entertainment system controller 125 may determine whether the vehicle 100 is operating in the autonomous mode by monitoring the status of the autonomous driving sensors 110. The process 700 may only continue if the vehicle 100 is operating in the autonomous mode. Therefore, the process 700 may return to block 710 if the vehicle 100 is not operating in the autonomous mode. If the vehicle 100 is operating in the autonomous mode, the process 700 may continue at block 720.

At block 720, the entertainment system controller 125 may enable the entertainment system 120. Enabling the entertainment system 120 may include lowering the projection screen 145 and/or the projector 140 from the ceiling and turning on the projector 140.

At decision block 725, the entertainment system controller 125 may determine whether the a user input has been received via, e.g., the user interface device 105 that indicates the user's desire to view media content via the entertainment system 120. If the user input has been received, the process 700 may continue at block 730. If the user input has not been received, the process 700 may repeat block 725 until the user input is received.

At block 730, the entertainment system controller 125 may cause the entertainment system 120 to present the media content in the passenger compartment 130 of the vehicle 100. The entertainment system 120 may continue to present media content until either a user input is received indicating a user's desire for the entertainment system 120 to stop presenting the media content or before the vehicle 100 switches from the autonomous mode to a non-autonomous mode of operation.

At block 735, the entertainment system controller 125 may continue to monitor the autonomous driving sensors 110 and also for any user inputs indicating the user's desire to no longer view media content through the entertainment system 120. For example, the entertainment system controller 125 may monitor the autonomous driving sensors 110 for signals indicating that user intervention is necessary or that the vehicle 100 is going to stop operating in the autonomous mode.

At decision block 740, the entertainment system controller 125 may determine whether the vehicle 100 is still operating in the autonomous mode. If so, the process 700 may continue at decision block 745. If the vehicle 100 is operating in a non-autonomous mode, the process 700 may continue at block 750.

At decision block 745, the entertainment system controller 125 may determine whether a user input indicating the user's desire to stop presenting media content through the first display has been received. Alternatively or in addition, the entertainment system controller 125 may determine whether the autonomous mode controller 115 has indicated that the driver should assume command of the vehicle 100. If such a user input or indication has been received, the process 700 may continue at block 750. If no user input indicating that the user desires for the entertainment system 120 to stop providing media content in the passenger compartment 130, the process 700 may return to block 735.

At block 750, the entertainment system controller 125 may set one or more components of the entertainment system 120 to, e.g., operate in a normal (i.e., non-autonomous) mode. For example, the entertainment system controller 125 may disable a first display so that the first display stops presenting media content. Instead of media content, the entertainment system controller 125 may cause the first display to present information useful to a driver for operating the vehicle 100.

At block 755, the entertainment system controller 125 may transfer the presentation of the media content to another display (i.e., a second display) in the passenger compartment 130. The presentation of the media content on the second display may not interfere with the driver's manual operation of the vehicle 100. Thus, passengers other than the driver can continue to view media content even after the driver has assumed control of the vehicle 100 (i.e., the vehicle 100 is no longer operating in the autonomous mode). The process 700 may end after block 755 or continue at block 710.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   an autonomous mode controller configured to control a vehicle in an autonomous mode;
   an entertainment system controller configured to determine whether the vehicle is operating in the autonomous mode or a non-autonomous mode and present media content on a first display when the vehicle is operating in the autonomous mode and on a second display, and not the first display, when the vehicle is operating in a non-autonomous mode,
   wherein the entertainment system controller is configured to present the media content on the first display when the vehicle is operating in the autonomous mode and transfer presentation of the media content to the second display when the vehicle is operating in the non-autonomous mode.

2. The vehicle system of claim 1, wherein the entertainment system controller is configured to present the media content via the first display while the vehicle is operating in the autonomous mode and in response to a user input.

3. The vehicle system of claim 1, wherein the entertainment system controller is configured to transfer the media content to the second display prior to the vehicle beginning to operate in the non-autonomous mode.

4. The vehicle system of claim 1, wherein the entertainment system controller is configured to present the media content via the second display in response to a user input.

5. A method comprising:
   determining whether a vehicle is operating in an autonomous mode;
   presenting media content on a first display while the vehicle is operating in the autonomous mode;
   determining whether the vehicle is operating in a non-autonomous mode; and
   transferring presentation of the media content to a second display when the vehicle is operating in the non-autonomous mode, wherein the media content is not presented on the first display when the vehicle is operating in the non-autonomous mode.

6. The method of claim 5, wherein the determination of whether the vehicle is operating in the autonomous mode includes monitoring at least one autonomous driving sensor.

7. The method of claim 5, wherein the determination of whether the vehicle is operating in the autonomous mode is based at least in part on a signal received from an autonomous mode controller.

8. The method of claim 5, wherein the media content is presented on the first display in response to a user input received while the vehicle is operating in the autonomous mode.

9. The method of claim 5, further comprising activating the second display and transferring the media content to the second display prior to the vehicle operating in the non-autonomous mode.

10. The method of claim 5, wherein the media content is presented on only the second display when the vehicle is operating in the non-autonomous mode.

11. The method of claim 5, wherein the media content is presented on the first display in response to a user input.

12. The method of claim 5, wherein the presentation of the media content is transferred to the second display in response to a user input.

13. A non-transitory computer-readable medium tangibly embodying computer-executable instructions that cause a processor to execute operations comprising:
    determining whether a vehicle is operating in an autonomous mode;
    presenting media content on a first display while the vehicle is operating in the autonomous mode;
    determining whether the vehicle is operating in a non-autonomous mode; and
    transferring presentation of the media content to a second display when the vehicle is operating in the non-autonomous mode, wherein the media content is not presented on the first display when the vehicle is operating in the non-autonomous mode.

14. The non-transitory computer-readable medium of claim 13, wherein the determination of whether the vehicle is operating in the autonomous mode includes monitoring at least one autonomous driving sensor.

15. The non-transitory computer-readable medium of claim 13, wherein the determination of whether the vehicle is operating in the autonomous mode is based at least in part on a signal received from an autonomous mode controller.

16. The non-transitory computer-readable medium of claim 13, wherein the media content is presented on the first display in response to a user input received while the vehicle is operating in the autonomous mode.

17. The non-transitory computer-readable medium of claim 13, further comprising activating the second display and transferring the media content to the second display prior to the vehicle operating in the non-autonomous mode.

18. The non-transitory computer-readable medium of claim 13, wherein the presentation of the media content is transferred to the second display in response to a user input.

* * * * *